United States Patent [19]

Ichii

[11] 4,332,451
[45] Jun. 1, 1982

[54] RELEASE SAFETY SHUTTER INTERLOCK FOR BATTERY POWERED CAMERA

[75] Inventor: Hirokazu Ichii, Iwatsuki, Japan

[73] Assignee: Fuji Photo Film Co., Ltd., Kanagawa, Japan

[21] Appl. No.: 200,656

[22] Filed: Oct. 27, 1980

[30] Foreign Application Priority Data

Oct. 30, 1979 [JP] Japan .................................. 54-140792

[51] Int. Cl.³ .................... G03B 9/08; G03B 17/38; G03B 19/02
[52] U.S. Cl. ..................................... 354/234; 354/83; 354/268
[58] Field of Search ................. 354/234, 235, 50, 266, 354/267, 268, 83, 86

[56] References Cited

U.S. PATENT DOCUMENTS

| 3,601,019 | 8/1971 | Kitai | 354/50 X |
| 3,947,858 | 3/1976 | Ishida | 354/234 |
| 4,110,771 | 8/1978 | Kindig | 354/83 X |
| 4,209,242 | 6/1980 | Kitai et al. | 354/234 X |

Primary Examiner—Donald A. Griffin
Attorney, Agent, or Firm—Sughrue, Mion, Zinn, Macpeak and Seas

[57] ABSTRACT

A shutter releasing system controlling apparatus for a self developing type instant camera equipped with a motor-driven treating liquid spreader. The shutter releasing operation is prevented not only when the battery is too low, but also during the motor driving operation of the treating liquid spreader. On and off timing control of the motor is correctly and safely performed by the shutter releasing system.

9 Claims, 3 Drawing Figures

RELEASE SAFETY SHUTTER INTERLOCK FOR BATTERY POWERED CAMERA

BACKGROUND OF THE INVENTION

The present invention relates to a self-developing instant camera equipped with a motor-driven treating liquid spreader and more particularly to a safety shutter releasing system.

Generally, the consumption of electric power required for the self-developing instant camera is several times as much as that for more simple common cameras.

Also, the F stop value of the photographing lens used for such cameras is generally larger in view of the resolving power of the sensitive film material used. Accordingly in a self-developing camera having such a high F stop lens, the guide number reflecting strobe flash power needed is also required to be larger if a strobe is built into the camera, and, the electric power consumed for the strobe itself becomes larger. Assume that a photographer using such a camera has depressed the shutter button too soon after a previous picture while the built-in strobe is still recharging. A rush of current for operating the motor driving the treating liquid spreader will immediately be required from a battery which has dropped in voltage due to the drain of the recharging strobe. The full electric power may not be supplied to the motor. The film unit may jam in the treating apparatus rendering the camera inoperable.

Also, another accident related to battery power might occur. The shutter release might occur too soon after a previous picture, interrupting treatment of the previous film unit and its motorized delivery, i.e., while the end of the film unit is still located inside the film unit container. The subsequent film unit could become jammed between a transport member (the film unit is delivered up to the treatment spreader) and the film container (the film container is generally adapted to have such a construction so as to deliver only one film at a time to prevent the two-delivery operation), resulting in a motor stop accident.

In addition, if the film container has no two-delivery preventing wall, the premature delivery operation of a following film unit into the treatment spreader through a premature second releasing operation might cause the treatment spreader not to work sufficiently or two films may enter the same time, stopping the motor.

To prevent such accidents as described hereinabove, a release lock is proposed to render the shutter releasing system and the treating liquid spreader inoperative through detection of battery voltage, if the battery has been used, by a battery checker (see U.S. Pat. No. 3,417,683 Publication).

SUMMARY OF THE INVENTION

The present invention provides a release controlling apparatus for self developing cameras, wherein the shutter releasing operation cannot again be performed, not only during voltage drop of the battery, but also during the driving operation of the treating-liquid spreader, and wherein the on and off timing control of the motor is correctly and safely performed.

A principal object of the present invention is to provide a release controlling apparatus for self developing cameras to prevent the problems described above.

The object and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
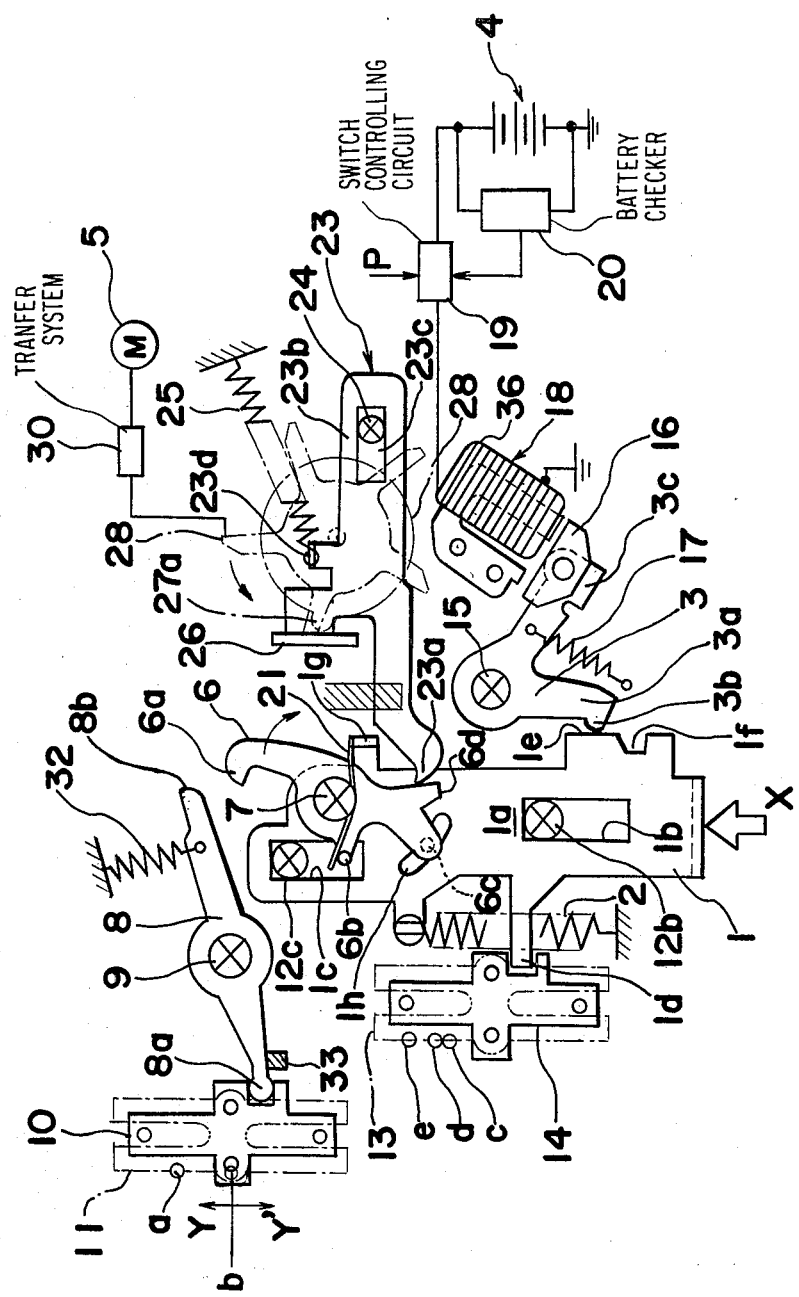
FIG. 1 is a plan view showing a condition where the releasing mechanism of a self developing type camera in one embodiment of the present invention is not yet released.

Referring to FIG. 1, a releasing member 1 is displaced, against the elasticity of a restoring spring 2, in a release direction shown by arrow X in the drawing in response to the depression of a camera shutter button (not shown) and is restored to its initial position through the elastic force of the restoring spring 2 after the shutter releasing operation. A locking lever 3 locks the releasing member 1 at an early stage of its release stroke if either the voltage of a battery 4 in the camera has dropped to or below a prescribed limit voltage or a motor 5 for driving a treating liquid spreader (not shown concretely) is operative. A hook lever 6 is rotatably pivoted, by a pin 7, on one end portion of the releasing member 1. A switching lever 8 is pivoted at its middle portion around a pin 9. One end 8a of the lever 8 is coupled to a guide member 11, which guides a sliding contact segment 10 for turning on or off a motor driving switch a, and a strobe charging switch b, while the other end 8b of lever 8 is adapted to be hooked by the hook 6a of hook lever 6 when releasing member 1 gets to the final stage of its release stroke.

The releasing member 1 is guided by pins 12b and 12c, which are engaged respectively with long grooves 1b and 1c provided in the longitudinal direction of the releasing member body 1a. Also, a guide member 14 is coupled to the tip end of an arm portion 1d projected sideways from the body 1a to guide a sliding contact segment 13 for turning on or off an underexposure warning switch c, a battery checking switch d and a shutter releasing switch e thereby to turn on each of the switches c, d and e, in sequential order, at the release stroke of the releasing member 1.

Figure 2:
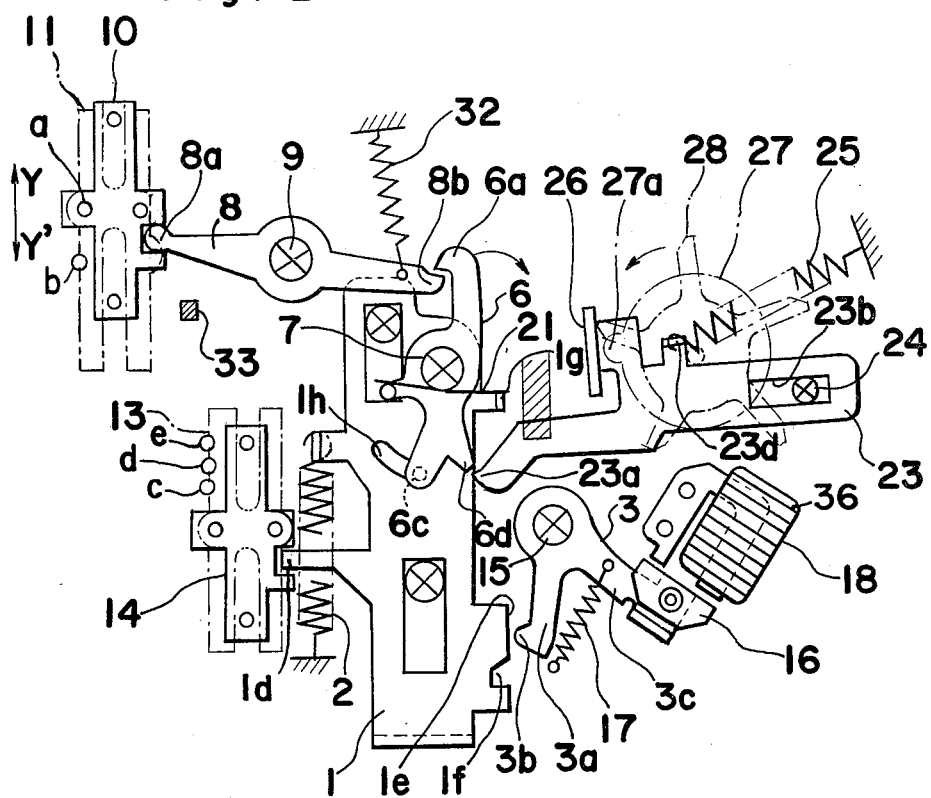
FIG. 2 is a plan view showing a condition immediately after the releasing operation.
Figure 3:
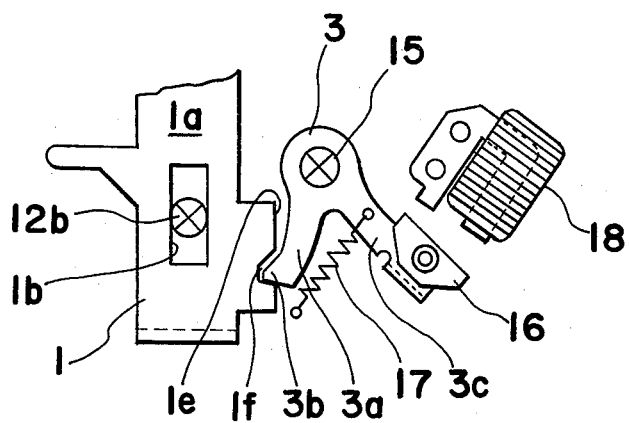
FIG. 3 is a partial plan view showing a locking condition of a releasing member.

On the other hand, the locking lever 3 is a forked lever, whose middle portion is rotatably mounted on a pin 15. One lever portion 3a thereof is provided with a convex projection 3b, which can be engaged with the concave portion 1f of a side projecting ear 1e provided on releasing member body 1a at its base portion. The other lever portion 3c of forked lever 3 is provided, at its tip end, with a magnetic armature 16 which can be an iron piece or the like. An electromagnet 18 is provided to, when energized, attracts the armature 16 to overcome the bias of a spring 17 and thus moves locking lever 3 from a locking position as shown in FIG. 3 to an unlocking position as shown in FIG. 2. The solenoid 36 of electromagnet apparatus 18 is energized by means of a switch controlling circuit 19 to the battery 4. Controlling circuit 19 normally turns on the electromagnet apparatus 18 at an early stage of the shutter releasing operation, but turns off the electromagnet 18 when either a battery checker 20 provided with respect to the battery 4 has detected a voltage equal to or lower than a predetermined voltage or a signal P indicating the motor 5 is being driven is received.

Also, hook lever 6 is normally (See FIG. 1) biased counterclockwise by a wire spring wound on pin 7, which is engaged at its one end with a spring catch 1g provided on the releasing member body 1a and at its other end with a spring engaging pin 6b provided on hook lever 6. Rotation of hook lever 6 is guided by a guide pin 6c engaged in an arcuate guide groove 1h provided in releasing member body 1a, the guide pin 6c extending opposite from the hook portion 6a and the pin 7 being located between them.

Hook lever 6 has an another projection portion 6d on the side opposite hook portion 6a. A hook releasing lever 23 causes, with respect to projection portion 6d, by moving to the left, clockwise rotation of hook lever 6 to release hook portion 6a from the switching lever 8 at a given time.

Hook releasing lever 23, which has a bill-shaped tip end 23a, which extends towards the projection portion 6d of the hook lever 6, is guided in a direction normal to the longitudinal direction of releasing member 1 by a guide pin 24, engaged in a longitudinal groove 23c provided in body 23b. Hook releasing lever 23 is adapted to be normally urged to the right in a direction separating it from releasing member 1 by a bias spring 25. Spring 25 is engaged to lever 23 at a direction inclined with respect to the body 23b, on a spring catch 23d provided on body 23b, the spring's other end is attached the mechanism's chassis.

As shown by a dotted line in the drawing, a controlling cam 27 is provided, to engage a side plate 26 bent in a direction normal to the body 23b of the releasing lever 23, to operatively control the releasing lever 23. Also, a star gear 28 is provided integrally with the controlling cam 27. Star gear 28 is adapted to be rotatably driven step by step by one member of a transfer system 30 for transferring the driving force of a motor 5 used to drive the treating liquid spreader. One driving cycle of motor 5 is controlled through one rotation of the star gear 28, i.e., the controlling cam 27.

In FIG. 1, a spring 32 normally biases switching lever 8, counterclockwise around pin 9 so one end 8a contacts a stopper 33.

Now, the operation of the above-described construction will be described.

(I) Shutter Release During The Normal Operation Of The Battery (a) Shutter Release FIG. 1 shows a stationary condition before the shutter is released. Electromagnet apparatus 18 is off. Locking lever 3 has its convex portion 3b retained in contact against a straight portion of side projecting ear 1e of releasing member 1 due to the bias of spring 17.

The shutter button of the camera is designed so that pressing the button causes pressure on releasing member 1 in the direction X in the drawing causing an initial upward motion of member 1. The underexposure warning switch c is turned on due to an initial displacement of the guiding member 14 which operatively cooperates with the releasing member 1 at this early stage of the release direction motion of releasing member 1 to operate the underexposure warning circuit. The switch d for the battery checker 20 is turned on to check whether or not battery 4 is above the predetermined limit voltage.

When the battery checker 20 finds the voltage of battery 4 is more than the prescribed voltage, the electromagnet 18 is connected to battery 4 by switch controlling circuit 19. The electromagnet 18 attracts armature 16 mounted on the locking lever 3 thereby holding locking lever 3 in an unlocked position in spite of the bias of spring 17, i.e., in a position where convex portion 3b of locking lever 3 does not drop into the concave portion 1f of ear 1e of releasing member 1.

Accordingly, the pressure resulting from the pressing of the shutter button can further displace in direction X without member 1 being blocked by the locking lever 3, turning on shutting switch e at the final stage of the release stroke of member 1 to perform the actual shutter releasing operation (in a position of the camera not shown).

(b) Motor Driving And Treating Liquid Spreading

Approximately simultaneously with the shutter release, hook portion 6a of hook lever 6 on the releasing member 1 hooks over one end 8b of the switching lever 8. As the returning stroke of member 1 starts due to the returning bias of restoring spring 2, hooked switching lever 8 is pivoted clockwise around pin 9 overcoming the counterclockwise bias of spring 32, thereby displacing upward guide member 11 of sliding contact segment 10 in the direction Y of FIG. 2.

Switch a for driving the motor is turned on through the displacement of segment 10 in the Y direction to close the driving circuit of the driving motor 5, starting motor 5 to drive the treating liquid spreader. The treating liquid spreader (not shown concretely) engages the exposed film unit between a pair of treating rollers to burst a treating liquid container and move the film unit to delivery while uniformly spreading the treating liquid of the film unit.

FIG. 2 shows a stage where releasing member 1 has been restored to its initial position. In the restoration of releasing member 1, projecting portion 6d of hook lever 6 comes into contact against bill tip end of releasing lever 23 turned in the going stroke to receive the bias of spring 25 on the releasing lever 23 and to receive a resulting counterclockwise moment around the pin 7, whereby the hooking operation of switching lever 8 by the hook lever 6 cannot be disengaged.

And simultaneously with the start of the driving operation of motor 5, switch controlling circuit 19 turns off electromagnet apparatus 18 because it is receiving signal P indicating the motor is being driven, releasing armature 16. Locking lever 3 is thus released in its locking direction so that any subsequent releasing operation of member 1 during the driving operation of the motor will be halted when convex portion 3b enters concave portion 1f.

On the other hand, star gear 28 is periodically driven step by step by one member of the power transmission system 30 of the motor 5. The controlling cam 27 is also intermittently rotated correspondingly a given angle pitch. Accordingly, under the starting condition of the motor 5 shown in FIG. 2, controlling cam 27 which has retained the side plate 26 of releasing lever 23 at its maximum going position by its projection 27a escapes only for a given space from the side plate 26 through the intermittent rotation. As a result, the releasing lever 23 separates correcting its angle from the projection portion 6d of the hook lever 6 with the elastic force of the spring 25. The star gear 28 is continuously driven step by step during the driving operation of the motor 5. The star gear 28, i.e., the controlling cam 27 performs one rotation. The convex portion 27a of the controlling cam 27 depresses the side plate 26 of the releasing lever 23 again against the bias of spring 25 to depress the releasing lever 23 to the maximum excursion position. Releasing lever 23 depresses the projection portion 6d of the hook lever 6 by its top end 23a to rotate hook lever 6 clockwise. The hook lever 6 releases the hook of switching lever 8 through this rotation. Switching lever 8 pivots under the bias of spring 32 until end 8a abuts stopper 33, the rotation of lever 8 restoring guide member 11 of the sliding contact segment 10 in the direction Y'. At this time, the motor driving switch a is turned off and the strobe charging switch b is turned on.

Thus, motor 5 is allowed to complete the motion for one treatment with interference.

(II) Cases Except For Regulated Voltage

Now let's assume the voltage of the battery 4 is the prescribed limit voltage or lower. First the underexposure warning switch c and the battery checking switch d will be turned on at the early stage of the release stroke of releasing member 1 to operate the battery checker 20. When the battery checker 20 is performing it detects that the voltage is too low and switch controlling circuit 19 remains in its off state due to the output signal of the battery checker 20.

Thus, at a stage where releasing member 1 is slightly displaced in the direction X, convex portion 3b of the locking lever 3 drops into concave portion 1f of side projecting ear 1e under bias of spring 17, blocking further displacement of releasing member 1 and preventing shutter releasing operation controlled by shutting switch e.

Accordingly, a photographer can ascertain the too weak condition of battery 4. He must then replace battery 4.

As described above, in a self developing type instant camera equipped with a motor-driven treating liquid spreader, the present invention provides a shutter releasing mechanism wherein when the voltage of the battery dropped to or below a prescribed limit voltage, the releasing mechanism is blocked so that the shutter releasing operation cannot be performed. The releasing mechanism is also blocked during the driving operation of the motor thereby to mechanically control the start and suspension of the driving operation of the motor.

The present invention has advantages in that double exposing hazards can be completely prevented. Various accidents as described above can be prevented and correct motor-driving operation controlled since the releasing operation is blocked even if the shutter button is depressed by mistake during the spreading of the treating liquid by the driving operation of the motor.

Although the present invention has been described and illustrated in particular detail, it is clearly understood that the same is by way of illustration and example only and is not to be taken by way of limitation, the spirit and scope of the present invention being limited only by the terms of the appended claims.

What is claimed is:

1. A shutter release controlling apparatus for a self-developing instant camera provided with a shutter means including a manually operable shutter button for regulating the exposure of a self-developing film unit having treating liquid, and a motor means energizable by a battery for driving a spreader means to spread the treating liquid across the film unit for development subsequent to the exposure, and for ejecting the self-developed film unit out of the camera, said apparatus comprising in combination:

a releasing member means responsive to shutter button movement for actuating the shutter means,
   a first means for preventing the releasing member means from actuating the shutter means when the battery voltage is insufficient to drive the motor means, and
   a second means for preventing the releasing member means from actuating the shutter means during the driving operation of the motor means for the spreader means.

2. A shutter release controlling apparatus as defined in claim 1, further comprising means responsive to movement of said releasing member means, after the completion of exposure for the film unit, for actuating the motor means.

3. A shutter release controlling apparatus as defined in claim 2, wherein a hook lever is carried by said releasing member and said apparatus includes a switching lever, and wherein said hook lever engages said switching lever to keep the motor means actuating until the ejection of the film unit out of the camera has been completed.

4. A shutter release controlling apparatus as defined in claim 3, wherein a switch means is operable by said switching lever during the returning stroke of the releasing member for actuating the motor means.

5. A shutter release controlling apparatus as defined in claim 4, wherein said switch means is retained by said hook lever means during the returning stroke of the releasing lever means.

6. A shutter release controlling apparatus as defined in claim 1, wherein said first means includes a locking means operable to lock the releasing member means for preventing actuation of the releasing member means, an electromagnet means which, when energized, prevents the locking means from locking the releasing member means, said locking means being operated to lock when the electromagnet means is de-energized, and a controlling circuit means for de-energizing the electromagnet means when the battery voltage is insufficient to drive the motor means.

7. A shutter release controlling apparatus as defined in claim 1, wherein said first means and second means are unitary to perform the functions of said first and second means.

8. A shutter release controlling apparatus as defined in claim 1, wherein said second means includes a locking means operable to lock the releasing member means for preventing actuation of the releasing member means, an electromagnet means which, when energized, prevents the locking means from locking the releasing member means, said locking means being operated to lock when the electromagnet means is de-energized, and a controlling circuit means for de-energizing the electromagnet means when the motor means has been sufficiently actuated to drive the spreader means to complete the ejection of the film unit out of the camera.

9. A shutter release controlling apparatus for self-developing instant camera provided with a shutter means including a manually operable shutter button adapted to regulate the exposure of a self-developing film unit having treating liquid, and a motor means energizable by a battery to drive a spreader means to spread the treating liquid across the film unit for the development subsequent to the exposure and to eject the self-developed film unit out of the camera, said apparatus comprising, in combination:
- a releasing member means responsive to the shutter button movement for actuating the shutter means,
- a locking means operable to lock the releasing member means for preventing actuation of the releasing member means,
- an electromagnet means which, when energized, prevents the locking means from locking the releasing member means, said locking means being operated to lock when the electromagnet means is de-energized, and
- a controlling circuit means for de-energizing the electromagnet means either when the battery voltage is insufficient to drive the motor means or when the motor means has been actuated insufficiently to drive the spreader means to complete the ejection of the film unit out of the camera.

* * * * *